T. FELL.
Tubes for Under-Ground Telegraph Lines.
No. 155,936.          Patented Oct. 13, 1874.
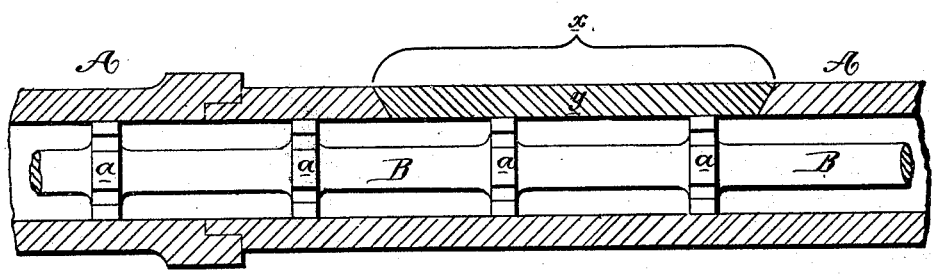
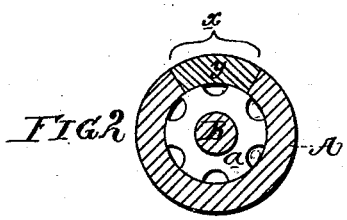
Witnesses,
Thomas M. Sloan
John K. Rupertus
Townsend Fell
by his Attys.
Howson and Son

UNITED STATES PATENT OFFICE.

TOWNSEND FELL, OF BRISTOL, PENNSYLVANIA.

IMPROVEMENT IN TUBES FOR UNDERGROUND-TELEGRAPH LINES.

Specification forming part of Letters Patent No. 155,936, dated October 13, 1874; application filed May 9, 1873.

*To all whom it may concern:*

Be it known that I, TOWNSEND FELL, M. D., of Bristol, Bucks county, Pennsylvania, have invented an Underground-Telegraph, of which the following is a specification:

The object of my invention is to so conduct groups of telegraph-wires under ground from point to point that all the wires of the group, while access may be had to any one of them, shall be completely insulated and protected from injury as well as isolated from each other; and this object I attain by a system of glass tubes, A, made in sections fitted together, as shown in Figure 1 of the accompanying drawing, the tubes containing disks $a$ of glass, arranged at suitable intervals, and notched at the edge, as shown in the transverse section, Fig. 2, one wire of the group being retained in each notch. The glass tubes may be made of such lengths as may be most convenient to manufacture, one end of the tube fitting and being cemented into the socket of an adjoining tube, as shown. The notched disks $a\ a$ are connected together by and form a part of a glass rod, B, each rod being, by preference, of the same length as a section of the tube A, and the disks being of such a diameter that they will pass freely into the tubes. In the present instance, each disk $a$ has six notches for receiving as many wires, which, being retained within the said notches by the interior of the tube, cannot come into contact with each other. I make in some or all of the sections of tubing an opening, $x$, to which is adapted a glass cover, $y$, the latter being fitted snugly to its place with proper non-conducting luting, and being wrapped to the pipe in such a manner that it can be withdrawn when, in rare cases, access to the wires is demanded. The notched disks $a$, while they isolate the wires, in no way interfere with access to any one or more of them, as does the isolating composition heretofore employed with groups of wire arranged in cases.

I have alluded to the tubes A and rods B, with their disks, as being made of glass, but it will be evident that earthenware, terra-cotta, or other equivalent non-conducting material may be used, although glass is to be preferred as the material whereof to make the tubes and internal rods and disks.

I claim as my invention—

The combination of tubes A of non-conducting material, and a series of internal notched disks, arranged at intervals, so as to support a series of wires throughout their entire length, as set forth.

In testimony whereof I have signed my name to this specification in the presence of two subscribing witnesses.

TOWNSEND FELL.

Witnesses:
  WM. A. STEEL,
  HUBERT HOWSON.